United States Patent [19]

Stone

[11] 3,860,824
[45] Jan. 14, 1975

[54] FLUID DRIVEN IN-CORE FLUX MAPPING PROBE SYSTEM

[75] Inventor: Gerald P. Stone, Saratoga, Calif.
[73] Assignee: Nuclear Services Corporation, Campbell, Calif.
[22] Filed: Oct. 23, 1973
[21] Appl. No.: 408,621

[52] U.S. Cl. ............... 250/390, 176/19 R, 250/442
[51] Int. Cl. ............................................. G21c 7/00
[58] Field of Search ........ 176/19, 26; 250/492, 439, 250/442, 453, 390, 391, 526

[56] References Cited
UNITED STATES PATENTS

| | | | |
|---|---|---|---|
| 2,874,107 | 2/1959 | Ohlinger | 250/453 |
| 3,207,667 | 9/1965 | Campbell | 250/390 |
| 3,681,194 | 8/1972 | Dieck | 176/19 |

Primary Examiner—Harold A. Dixon
Attorney, Agent, or Firm—Jack M. Wiseman

[57] ABSTRACT

A fluid drive system is disclosed for moving a neutron flux level probe in one or more guide tubes extending into a reactor core. A guide member which is part of the probe drive system is disposed for establishing fluid communication with one of a plurality of guide tubes in the reactor core by an indexing mechanism. A flux level probe is mounted in one end of an elongated sheath. The probe end of the sheath extends through a seal or a stabilizing member secured to the guide member and the other end of the sheath is provided with a seal extending to an inner surface of the guide member, such that an expansion chamber is formed thereby. The other end of the sheath and the end of an electrical cable extending from the probe and through the sheath are secured to a take-up reel. A fluid pump is connected in a line having its one end in fluid communication with the expansion chamber formed between the seal and its other end in fluid communication with the end of the sheath which is secured to the take-up reel. Accordingly, when fluid is supplied to the expansion chamber, a fluid return extends from the probe end of the sheath, through the sheath, and through the core of the take-up reel to the other side of the pump to move the probe into one of the core guide tubes. When the fluid pump is reversed, the opposite condition exists and the probe is moved out of a core guide tube.

10 Claims, 3 Drawing Figures

PATENTED JAN 14 1975 3,860,824
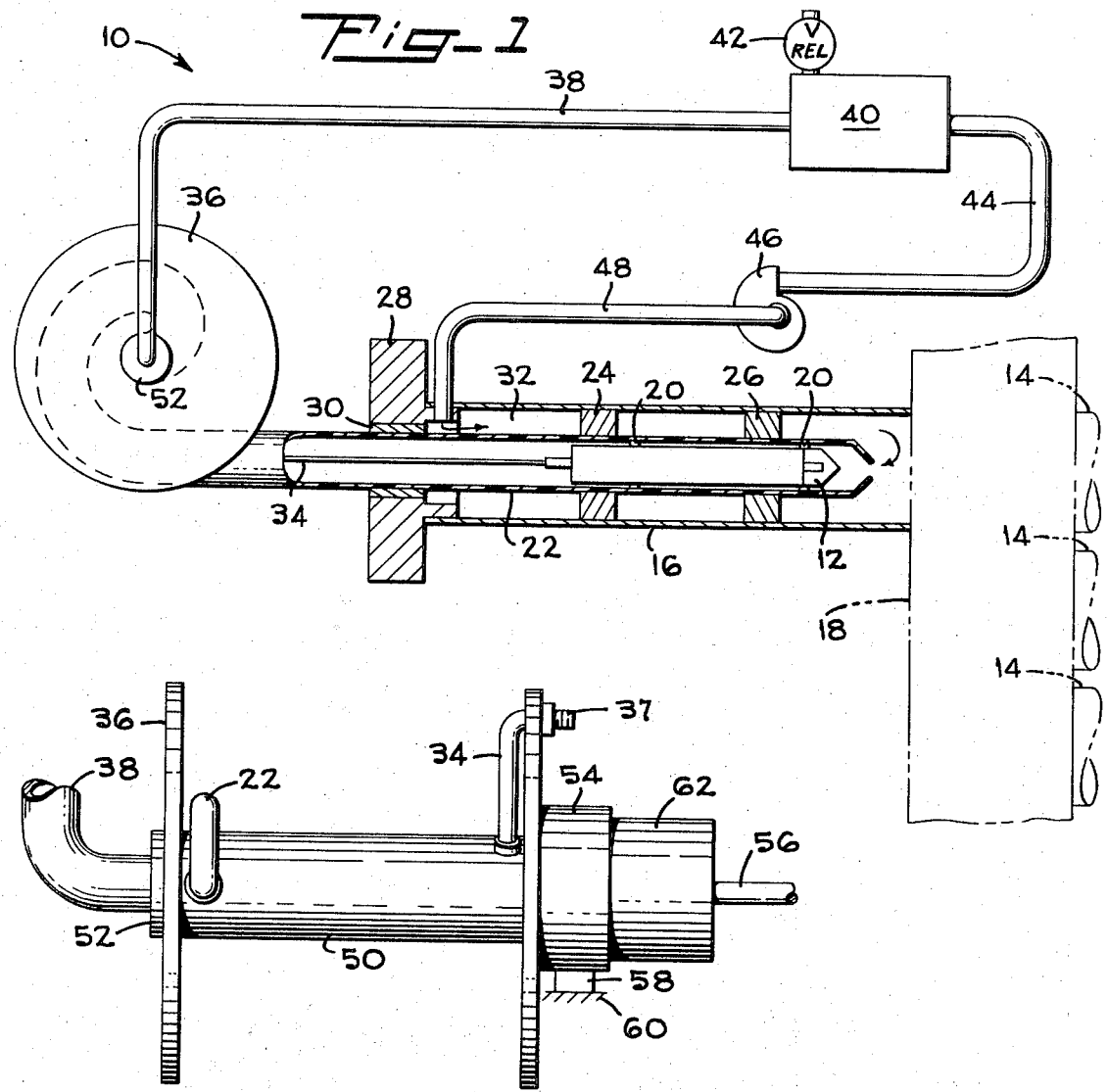
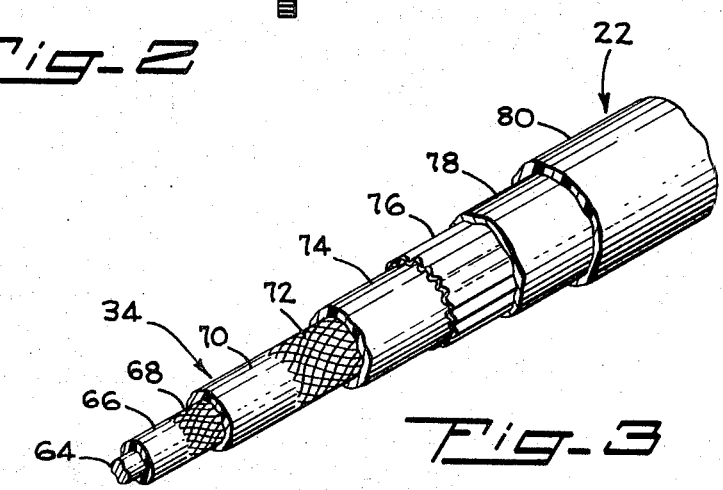

FLUID DRIVEN IN-CORE FLUX MAPPING PROBE SYSTEM

BACKGROUND OF THE INVENTION

1. Field of the Invention

This invention relates generally to a system for positioning a probe in a guide tube, and more particularly to a fluid drive system for moving a flux mapping probe in a guide tube or channel of a reactor core.

2. Prior Art

Flux mapping systems are required for reactor cores to measure the axial neutron flux level of the reactor core at a plurality of positions. One such system employs a plurality of guide tubes extending into the reactor core and a mechanism for moving a flux level detecting probe along the length of such guide tubes and recording the neutron flux level and probe position on an X-Y recorder. This information is also supplied to a site computer for comparing the thus acquired flux measurements with fixed in-core monitoring flux measurements to determine the flux amplifier gain adjustments required to calibrate and standardize the fixed in-core flux monitoring channels.

In a prior known system for remotely positioning a flux level probe in such guide tubes, a helically wound steel spring is mounted on the electrical cable extending from the probe. The other end of the cable is secured to a take-up reel which cooperates with two other reels for supplying information in the form of electrical signals to a monitor without the need for commutator slip rings or the like. A drive hobbed wheel is disposed for engaging the helically wrapped steel spring to move the cable in either direction within a guide tube. An indexer mechanism mechanically aligns a drive guide tube with one of a plurality of core guide tubes extending into the reactor core.

The prior known system drives the flux level detecting probe and its associated cable through the guide tube by pushing a helically wound steel spring covering on the cable in one direction or the other. The speed of such a drive system is relatively slow and, therefore, the mapping operation is time consuming. The requirements for mapping reactor core flux densities have increased in recent years due to increased power densities and errors in predicting burn-ups. In addition, the larger power densities contribute a greater noise level to the fixed in-core flux monitoring systems, thereby requiring more rapid acquisition of flux density information to permit more rapid updating of the gain of the amplifiers associated with each monitoring system. The site computer is employed for calculating and predicting the decay curve of a particular chamber of the reactor core throughout its active life and for readjusting the gain of the amplifier. The flux monitoring system is employed to determine whether the actual decay is at the predicted rate. If this information is not acquired and assimilated before a large error exists between the actual decay and the predicted decay, the reactor core will be less efficient for the production of nuclear power. As a result, the above described system is not capable of satisfying the present demands and requirements, since it cannot provide the necessary flux density information within a reasonable time frame.

This type of drive system is also susceptible to excessive wear on the steel guide tubes caused by the frictional engagement of the steel spring passing therethrough. Accordingly, the useful life of such a drive system is relatively short. Furthermore, the products of the mechanical rubbing and wear become easily contaminated, thereby creating a problem when it is necessary to dispose of the probe and driving cable.

SUMMARY OF THE INVENTION

Accordingly, it is a primary object of this invention to provide a fluid drive system for moving a probe in a guide tube.

A related object of this invention is to provide a drive system for moving a probe in a guide tube which can operate with greater speed than heretofore attainable.

Another object of this invention is to provide a drive system for moving a probe in a guide tube which is susceptible to less wear on the mating and sliding parts than heretofore achieved with prior known systems.

These and other objects of the present invention are attained by the provision of a sheath which is secured to and disposed for being wound on a take-up reel at its one end and which houses a flux level sensing probe in its other end. The sheath extends through a seal. The seal engages the sheath and a guide member to form an expansion chamber and seals the fluid flow between the expansion chamber and a chamber receiving the tip of the sensing probe. A fluid pump is disposed in fluid communication with the expansion chamber and alters the fluid pressure between the expansion chamber and the chamber receiving the tip of the probe for establishing a fluid pressure differential therebetween to move the probe within the guide member.

A feature of the present invention resides in the provision of a fluid return path from the end of the probe through the sheath and take-up reel to the other side of the fluid pump.

The present invention provides in a system which is less susceptible to contamination, a relatively fast operating cycle, and increased accuracy. The fluid drive system of the present invention is capable of moving a probe through a core guide tube at a greater rate than prior known mechanical drive systems. Furthermore, the sealing arrangement of the fluid drive system greatly reduces the possibility of contamination from a reactor core reaching the external surroundings.

BRIEF DESCRIPTION OF THE DRAWINGS

These and other objects, features and advantages of the present invention, however, will be more fully realized and understood from the following detailed description when taken in conjunction with the accompanying drawing wherein:

FIG. 1 is a partial diagrammatic and partial plan view, with certain structures shown in cross section, of a drive system for moving a probe within a reactor core guide tube which is constructed in accordance with the principles of the present invention.

FIG. 2 is a plan view, partially broken away, of the take-up reel assembly illustrated in FIG. 1.

FIG. 3 is a view in perspective of the cable and sheath illustrated in FIG. 1 and extending from the probe to the take-up reel.

Like reference numerals throughout the various views of the drawing are intended to designate the same components.

DETAILED DESCRIPTION OF THE PREFERRED EMBODIMENT

With reference to the drawing in detail, and in particular to FIG. 1, there is shown one preferred embodiment of a fluid drive system which is generally designated with the reference numeral 10 and is intended to move a flux level sensing probe 12 into and out of one of a plurality of core guide tubes 14. A guide member 16 supports the probe 12 in its rest and/or seeking position and a indexer mechanism 18 aligns the guide member 16 with one of the core guide tubes 14. The indexer mechanism 18 is provided with suitable sealing structures for sealingly connecting the guide member 16 with one of the guide tubes 14. The core guide tubes 14 extend into a reactor core and movement of the probe through one of such guide tubes permits a reading to be made of the flux density therein.

The use of a translatable probe, indexing mechanism and guide tubes extending into a reactor core is old in the art. Such devices are employed in apparatus manufactured by the Nuclear Instrumentation Department of General Electric Company of San Jose, California and are referred to in connection with installations thereof as Traversing In-Core Probe Calibration Systems. Accordingly, details of the flux level sensing probe 12, indexing mechanism 18 and core guide tubes 14 need not be discussed herein for purposes of explaining the drive system of the present invention. The drive systems employed in the past for moving a probe through a core guide tube have been mechanical, employing a driven hobbed wheel which drivingly engages a helically wound steel spring mounted on the electrical cable extending from the probe. The drive system of the present invention employs a fluid pressure differential between a fluid expansion chamber and a chamber for moving the probe through a core guide tube.

More particularly, the probe or sensor 12 is mounted by appropriate spacers 20 in one end of a sheath 22. The spacers 20 are corrupted or convoluted to permit fluid communication from the tip end of the probe 12 to its other end within the sheath 22. In the exemplary embodiment, a pair of seals 24 and 26 are mounted on the probe end of the sheath 22 and extend to and sealingly engage with an inner surface of the guide member 16. It is apparent that the seal 26 may be a suitable stabilizing member instead of a seal. A support member 28 is mounted in an end of the guide member 16 and supports a seal 30 in sealing engagement with the sheath 22. The seals 24 and 30, sheath 22, guide member 16 and support member 28 form an expansion chamber which is designated with the reference numeral 32.

An electrical signal transmitting cable 34 is illustrated diagrammatically in FIG. 1 and extends from the probe 12 and through the sheath 22. The other end of the cable 34 and an end of the sheath 22 are secured to and are disposed for being wound on the core of a take-up reel 36. The electrical connection of the cable 34 through the take-up reel 36 to output terminals can be performed in any suitable manner and structures for performing such a function are well known in the art. Reference again may be made to the aforementioned General Electric apparatus. One prefered arrangement for effecting such a connection without the use of commutator slip rings employs a rotatable reel and fixed reel (not shown) in combination with the take-up reel 36. The cable 34 extends through the core of the take-up reel 36 (see FIG. 2) and extends from one side thereof through a suitable connector 37.

The connector 37 is disposed for being connected to the core of the secured rotatable reel by a suitable cable (not shown) which also extends from the reel to the fixed reel through a spring biased pulley arrangement, such that rotation of the rotatable reel around the fixed reel with the rotation of the take-up reel 36 will not result in any twisting of the cable extending between the various reels. This structure, however, as discussed above is old in the art and specific details of its construction are not needed for a complete understanding of the present invention. Reference again may be made to the aforementioned General Electric apparatus.

The end of the sheath 22 is also secured to the core of the take-up reel 36 and such connection is sealed from ambient surroundings. The core of the take-up reel is connected by a fluid conduit 38 to one side of an expansion tank 40 having a pressure relief valve 42 connected thereto. A conduit 44 extends from the expansion tank 40 to one side of a reversible fluid pump 46 having the other side connected through a conduit 48 to the chamber 32.

When the fluid pump 46 is energized to increase the fluid pressure within the chamber 32, the fluid pressure within the sheath 22 will decrease, thereby causing the probe 12 to be moved to the right as viewed in FIG. 1 and to be moved through the indexer mechanism 18 into one of the core guide tubes 14 which is aligned with the guide member 16. Reversal of the pump 46 will decrease the pressure in the chamber 32 and increase the pressure in the sheath 22 and in a second chamber receiving the tip of the probe 12 to move the probe 12 out of a core guide tube 14.

As the probe 12 and the sheath 22 are moved, the take-up reel 36 rotates to either wind up or unwind the sheath 22 and cable 34. As shown in FIG. 2, an end of the sheath 22 with the cable 34 housed therein is secured to a core 50 of the take-up reel 36. The core 50 is sealed for ambient surrounding pressure and the cable 34 passes through a center of the core 50 and exits therefrom as illustrated for connection through a side wall of the take-up reel 36 to the connector 37. A rotating seal 52 is secured to an end of the core 50 and rotatably supports an end of the conduit 38. The take-up reel 36 is spring biased in a direction to wind the sheath 22 on the core 50 by a coil spring 54 mounted on a shaft 56 which rotatably supports the take-up reel 36. A tab 58 of the coil spring 54 is secured to a housing support 60. A resolver or rotation position translating device 62 is connected to the shaft 56 and provides positional information at its output.

As shown in FIG. 3, the cable 34 is a triaxial cable formed of a center conductor 64, an insulating covering 66 for the conductor 64, an inner shield 68 in the form of a woven metallic sheath, an insulating covering 70 for the conductor 68, an outer shield 72 in the form of a woven metallic sheath, and an insulating covering 74 for the conductor 72. The sheath 22 is formed of suitable porous fillers material designated with the reference numeral 76 and surrounding the insulating covering 74, a relatively thin metallic tube 78, such as metalized Mylar, surrounding the porus material 76, and a protective plastic sheath 80 surrounding the tube 78. In a preferred embodiment of the present invention, the porous material 76 is formed of corrougated irradiated polyethylene having a continuous W cross sectional configuration. The tube 80 is preferably formed of a relatively thin walled stainless steel tubing. The protective sheath 80 is preferably irradiated polyethylene.

It can be appreciated that the sheath 22 and cable 34 can be easily wrapped or wound on the core 50 of the reel 36 because of the compact configuration thereof. The porous filler layer 76 provides fluid communication between the ends of the sheath 22 and maintains such communication when the sheath 22 is wound on the core 50 of the reel 36 by supporting the tube 78 a fixed radial distance from the covering 74. Known fluid mediums are liquid helium and demineralized water.

The use of the resolver 62 for measuring the displacement of the probe 12 also obviates any back lash in the drive system, thereby increasing the accuracy of the system of the present invention over prior known systems. It can be appreciated, therefore, that the increased speed and accuracy of this system permits more rapid acquisition and accurate assimulation of information. Furthermore, the smooth outer surface of the sheath 22 reduces wear of the mating surfaces, thereby reducing replacement costs.

I claim:

1. A system for moving a probe in a guide member, comprising:
   a. a sheath extending into said guide member and including means for supporting said probe to dispose the tip of said probe in one end of said sheath,
   b. seal means mounted between said sheath and an inner surface of the guide member and forming an expansion chamber therebetween, said seal means engaging said sheath and said guide member for sealing the fluid flow between said expansion chamber and a second chamber receiving the tip of said probe, and
   c. means for varying the fluid pressure between said expansion chamber and said second chamber for establishing a fluid pressure differential between said expansion chamber and said second chamber to move said probe relative to said guide member.

2. A system as defined in claim 1, wherein said supporting means permits fluid communication between the ends of said probe within said sheath, and said fluid pressure varying means including a fluid pump communicating between said expansion chamber and said second chamber.

3. A system as defined in claim 2, wherein one end of said guide member is disposed for forming said second chamber with a guide tube, said guide tube having one end closed and the other end sealingly secured to the other end of said guide member, whereby a fluid differential is established between said expansion chamber and said second chamber to move said probe relative to said guide member and said guide tube.

4. A system as defined in claim 3, wherein said fluid pump is reversible to permit pressure differential in either direction between said expansion chamber and said second chamber to move said probe in either direction.

5. A system as defined in claim 2, further comprising a take-up reel including means for sealingly receiving the other end of said sheath and for communicating with a conduit, and said fluid pump being connected to said conduit through said receiving means for establishing the differential pressure to move said probe.

6. A system as defined in claim 5, wherein said probe is a neutron flux level sensor, and further comprising an electrical cable extending from said sensor to said take-up reel through said sheath for supplying information in the form of electrical signals from said sensor to output terminals on said take-up reel.

7. A system as defined in claim 1, further comprising a take-up reel including means for receiving the other end of said sheath.

8. A system as claimed in claim 7, wherein said supporting means permits fluid communication between the ends of said probe within said sheath, and said fluid pressure varying means including a fluid pump connected between said expansion chamber and said second chamber.

9. A system as defined in claim 1, wherein said sheath includes an electrical conductor having an insulating covering, a protective layer surrounding said covering, and a fluid porous material between said covering and said layer.

10. A system as defined in claim 9, wherein said porous material is corrugated sheet material.

* * * * *